(12) United States Patent
Mehta et al.

(10) Patent No.: US 7,966,420 B2
(45) Date of Patent: Jun. 21, 2011

(54) ENHANCE FAULT TRACING IN MULTI-TIERED ETHERNET/MPLS NETWORK

(75) Inventors: Rishi Mehta, San Jose, CA (US); Sriganesh Kini, San Jose, CA (US); Peter Arberg, Victoria (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 383 days.

(21) Appl. No.: 11/955,971

(22) Filed: Dec. 13, 2007

(65) Prior Publication Data

US 2009/0113070 A1 Apr. 30, 2009

Related U.S. Application Data

(60) Provisional application No. 60/983,829, filed on Oct. 30, 2007.

(51) Int. Cl.
*G06F 15/16* (2006.01)
(52) U.S. Cl. .................. 709/244; 709/238; 709/239
(58) Field of Classification Search .................. 709/244
See application file for complete search history.

(56) References Cited

U.S. PATENT DOCUMENTS

| | | | |
|---|---|---|---|
| 2003/0145105 A1* | 7/2003 | Desineni et al. | 709/238 |
| 2007/0025256 A1* | 2/2007 | Hertoghs et al. | 370/236.2 |
| 2008/0016402 A1* | 1/2008 | Harel et al. | 714/43 |
| 2008/0285466 A1* | 11/2008 | Salam et al. | 370/241.1 |
| 2009/0113070 A1* | 4/2009 | Mehta et al. | 709/238 |

OTHER PUBLICATIONS

"MPLS OAM Tools for Troubleshooting MPLS Networks", Cisco Systems, Inc., 2004, 44pgs.
RFC 3429, "Assignment of the 'OAM Alert Label' for Multiprotocol Labe; Switching Architecture (MPLS) Operation and Maintenance (OAM) Functions", H. Ohta, NTT, Nov. 2002, 6pgs.
RFC 4687, "Operations and Management (OAM) Requirements for Point-to-Multipoint MPLS Networks", S. Yasukawa, Sep. 2006, 14pgs.
"Ethernet Operations, Administration, and Maintenance", Cisco Systems, Inc., 1992-2007, 15pgs.

* cited by examiner

*Primary Examiner* — Jeffrey Pwu
*Assistant Examiner* — Sulaiman Nooristany
(74) *Attorney, Agent, or Firm* — Blakely, Sokoloff, Taylor & Zafman LLP (57) ABSTRACT

Techniques for providing connectivity fault management (CFM) for a multi-tiered network are described herein. In one embodiment, a link trace message (LTM) is received at a provider edge (PE) router and originated from a first Ethernet node and destined to a second Ethernet node, where the PE router interfaces an Ethernet and a multi-protocol label switching (MPLS) network. In response, the PE router initiates an MPLS trace session, including generating an MPLS trace message based on the LTM message to one or more MPLS nodes along a path between the first and second Ethernet nodes within the MPLS network. Subsequently, in response to one or more MPLS trace reply messages from the MPLS nodes of the MPLS network, the PE router generates a first link trace reply (LTR) message and sends the first LTR message to the first Ethernet node over the Ethernet. Other methods and apparatuses are also described.

12 Claims, 6 Drawing Sheets

ENHANCE FAULT TRACING IN MULTI-TIERED ETHERNET/MPLS NETWORK

RELATED APPLICATIONS

This application claims the benefit of U.S. Provisional Patent Application No. 60/983,829, filed Oct. 30, 2007, which is incorporated by reference in its entirety.

FIELD OF THE INVENTION

The present invention relates generally to fault management in networking devices. More particularly, this invention relates to enhance fault tracing in a multi-tiered Ethernet/MPLS network.

BACKGROUND

As it is generally known, Operations Administration and Management (OAM) is a standard term referring to tools used to monitor and troubleshoot a network. OAM for switched Ethernet networks is being standardized in IEEE 802.1ag under the name "Connectivity Fault Management" (CFM), and in ITU-T SG13 under the name "OAM Functions and Mechanisms for Ethernet based networks". Typically, Ethernet CFM is defined specifically for fault management for Ethernet and it does not work for other types of networks such as, Virtual private LAN services (VPLS) over Multi-protocol Label Switching (MPLS), which requires a specific MPLS OAM. Service provider networks are increasingly using/ building mixed networks including switched Ethernet and MPLS.

Figure 1:
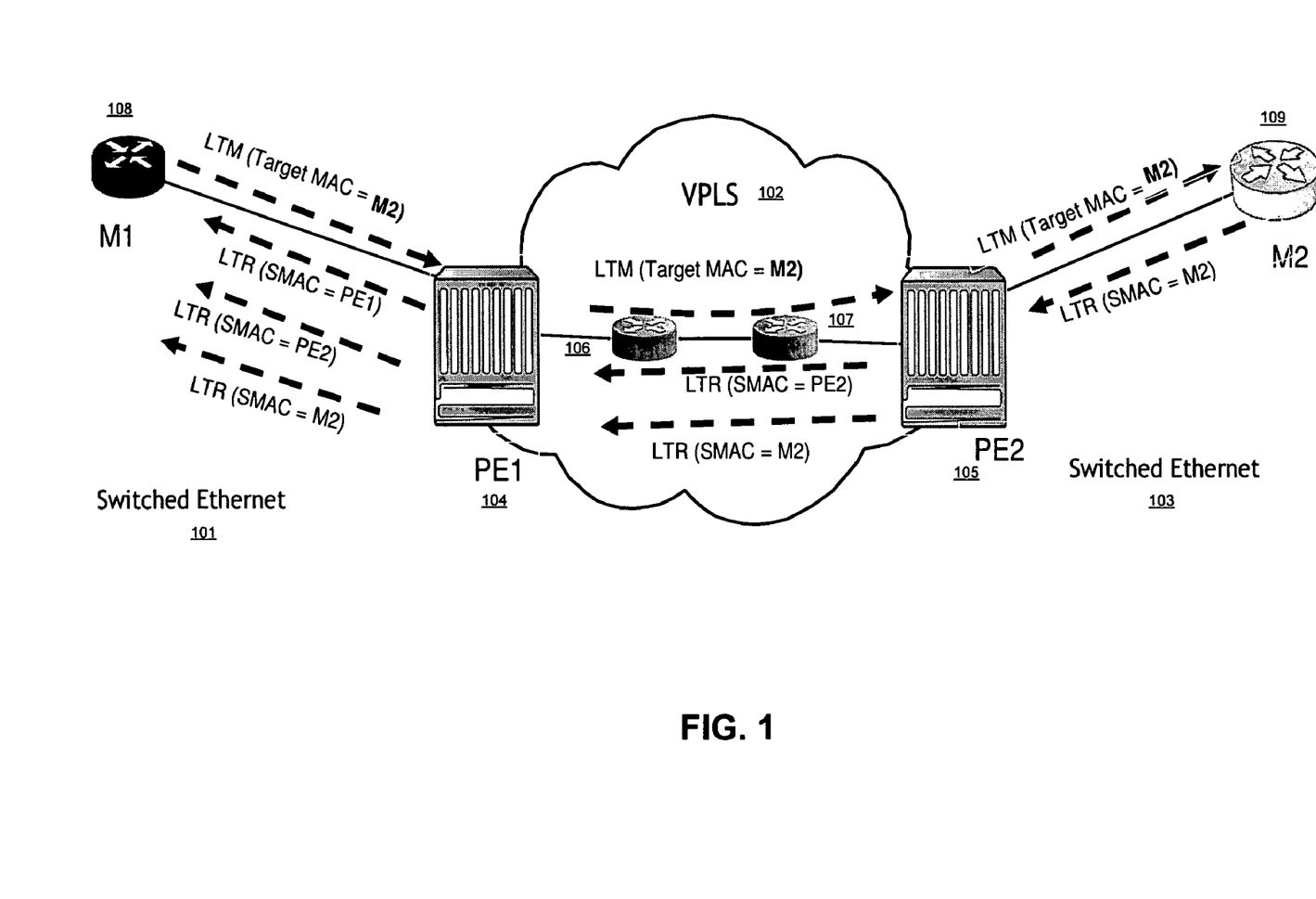
FIG. 1 is a block diagram illustrating a typical network configuration having a multi-tiered network.

FIG. 1 is a block diagram illustrating a typical network configuration having a multi-tiered network. In this example, switched Ethernet 101 is coupled to a VPLS/MPLS network 102 via a provider edge (PE) router 104, where a PE is also referred to as a label edge router (LER). Similarly, switched Ethernet 103 is coupled to the VPLS/MPLS 102 via 105. Within the VPLS/MPLS network 102, one or more core routers (also referred to as P routers) 106-107 are used to route MPLS packets between PEs 104-105.

When an Ethernet CFM operation is initiated, for example, Ethernet node 108 sends a link-trace message (LTM) as described in 802.1ag CFM to PE 104. The original LTM 110 is destined to a destination Ethernet node 109 (e.g., destination media access control or MAC address of node 109). In response, PE 104 responds with a link-trace reply (LTR) message having a source MAC address of PE 104 and forwards the LTM message to PE 105 via pseudo-wire. In addition, PE 105 also responds with an LTR after receiving the LTM from PE 104 having a source MAC of PE 105 and forwards the original LTM to node 109. Assuming there is no fault in the network, in response to the original LTM, node 109 responds with an LTR having a source MAC address of node 109, which is routed back to the originator node 108. Thus, all LTRs are received by node 108 from PEs 104-105 and node 109.

Figure 2A:
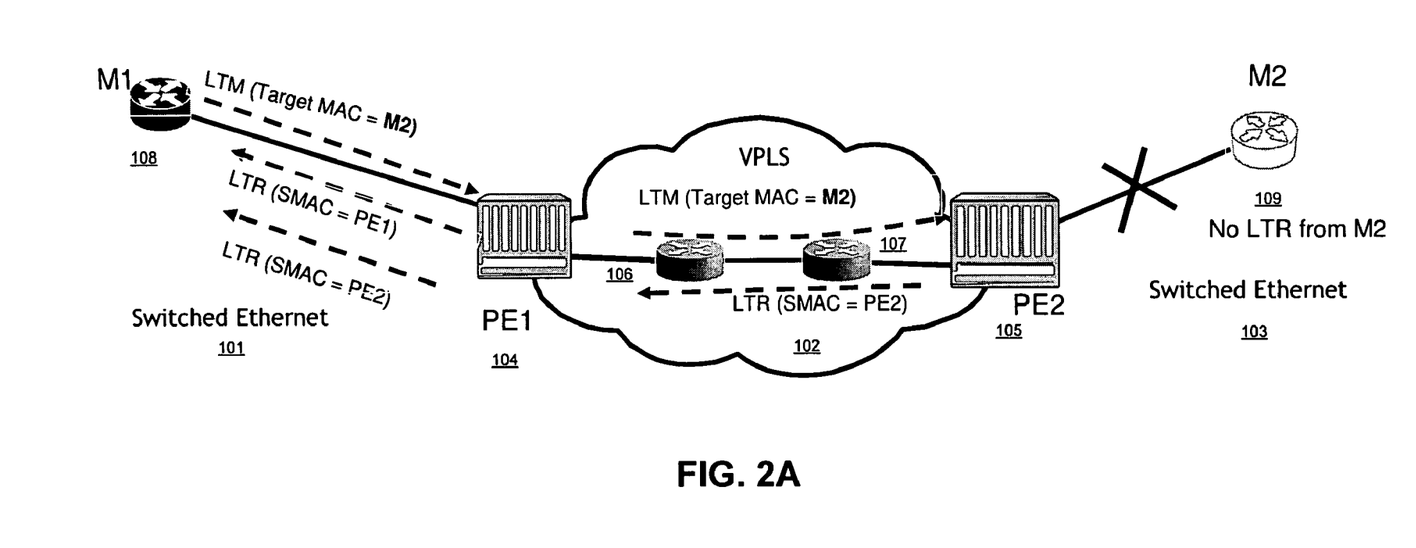
FIGS. 2A-2B are block diagrams illustrating certain fault scenarios in a network configuration of FIG. 1.
Figure 2B:
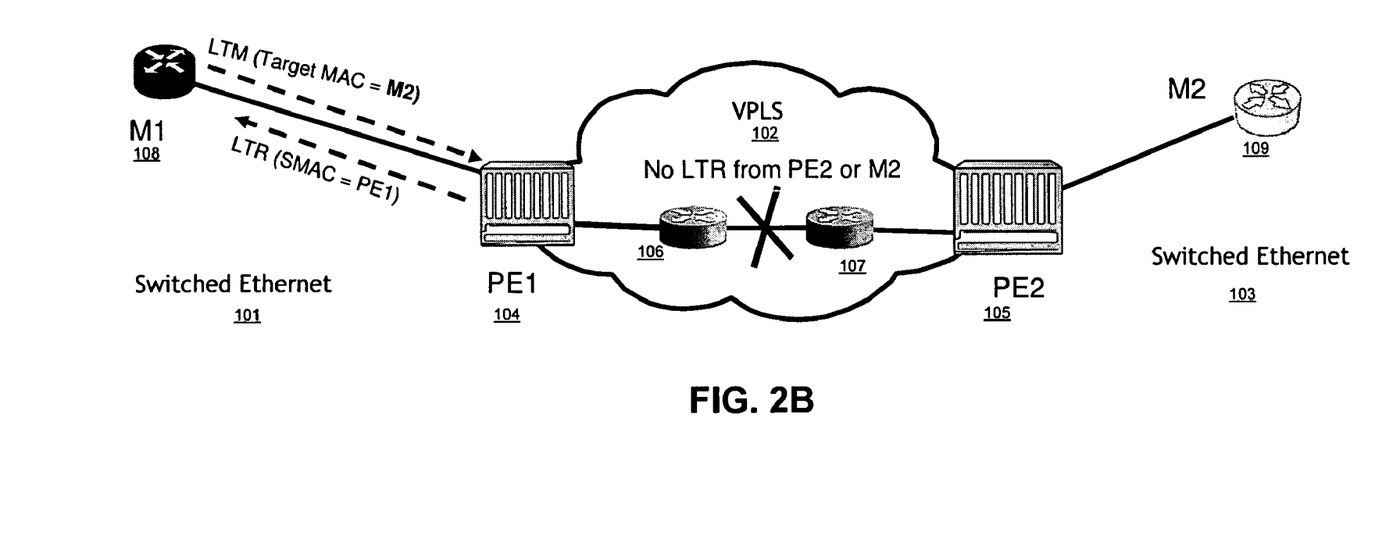

FIGS. 2A-2B are block diagrams illustrating certain fault scenarios in a network configuration of FIG. 1. Referring to FIG. 2A, it is assumed that there is a link fault in a path between PE 105 and node 109. In this scenario, after sending an LTM, although the originating node 108 receives LTRs from PE 104 and PE 105, node 108 never receives an LTR from node 109. In this example, node 108 may be able to determine that there is an error in a link between PE 105 and node 109 or the problem is with node 109.

However, if there some errors occur within the VPLS/ MPLS network 102 as shown in FIG. 2B, the situation may be more complicated in which node 108 may not be able to determine the location of the errors. Referring to FIG. 2B, in this example, it is assumed that there is an error occurred in a link between core routers 106-107. When PE 104 receives an LTM from node 108, PE 104 forwards the LTM to the corresponding destination, node 109. Since the link between core routers 106 and 107 is broken, PE 105 and node 109 never receive the forwarded LTM. As a result, corresponding LTRs from PE 105 and node 109 are not received by PE 104 by the originating node 108. Thus, node 108 cannot determine whether there is any link error among the links between PE 104 and PE 105, or alternatively the problem could be with PE 105.

SUMMARY OF THE DESCRIPTION

Techniques for providing connectivity fault management (CFM) for a multi-tiered network are described herein. In one embodiment, a link trace message (LTM) is received at a provider edge (PE) router, where the PE router interfaces an Ethernet and a multi-protocol label switching (MPLS) network. The LTM message is originated from a first Ethernet node and destined to a second Ethernet node. In response to the LTM message, the PE router initiates an MPLS trace session, including generating an MPLS trace message based on the LTM message and sending the MPLS trace message to one or more MPLS nodes along a path between the first and second Ethernet nodes within the MPLS network. Subsequently, in response to receiving one or more MPLS trace reply messages from the one or more MPLS nodes of the MPLS network, the PE router generates a first link trace reply (LTR) message based on the one or more MPLS trace reply messages and sends the first LTR message to the first Ethernet node over the Ethernet.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for providing connectivity fault management (CFM) for a multi-tiered network are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, in response to an LTM received from a node of the Ethernet, a PE that interfaces the Ethernet and an MPLS network is configured to, in addition to forward the LTM to the intended destination, triggers an MPLS trace session within the MPLS network. After the PE receives any MPLS trace replies from the MPLS nodes on the path within the MPLS network, the PE translates the MPLS trace replies into an LTR that is transmitted back to the originating Ethernet node. As a result, any link or node error within the MPLS network can be traced by the originating Ethernet node.

Figure 3:
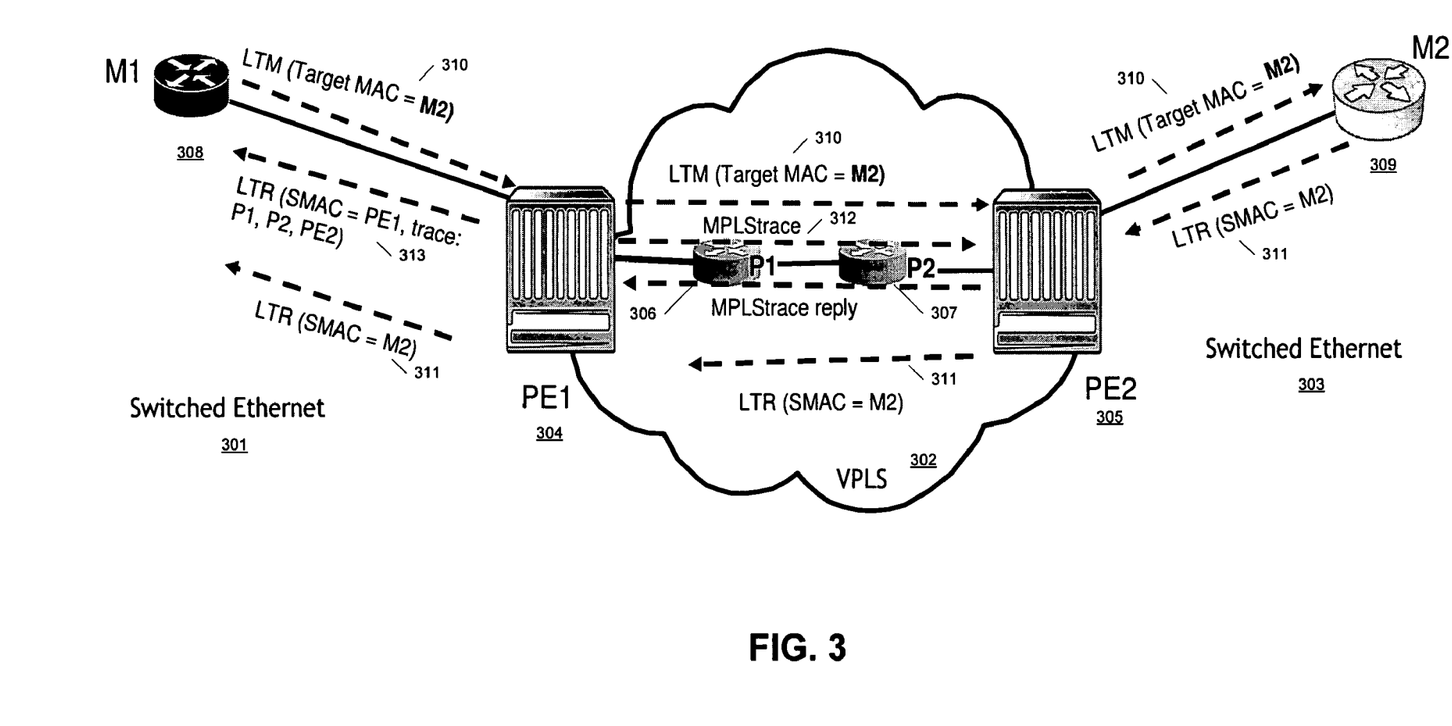
FIG. 3 is a block diagram illustrating an example of process for providing link trace capabilities in a multi-tiered network according to one embodiment of the invention.

FIG. 3 is a block diagram illustrating an example of process for providing link trace capabilities in a multi-tiered network according to one embodiment of the invention. Referring to FIG. 3, when PE 304 receives an LTM from an originating Ethernet node 308, PE 304 forwards the LTM 310 to the destination Ethernet node 309, which responds with an LTR 311. The LTR 311 is routed back to the originating node 308. In addition, in response to the LTM 310 received from node 308, PE 304 initiates an MPLS trace message to the MPLS tunnel which carries the pseudowire (e.g., PE 304-core router 306-core router 307-PE 305) of the MPLS network, which in this example, including core outers 306-307 and PE 305. In one embodiment, the MPLS trace message 312 is constructed based on the LTM 310 according to certain configurations such as a set of rules or an Ethernet CFM/MPLS OAM event mapping table, which may be configured by an administrator of a service provider network. Each of the routers 306-307 and PE 305 responds with an MPLS trace reply message back to PE 304. In view of all the MPLS trace reply messages received from core routers 306-307 and PE 305, PE 304 incorporates the received MPLS trace messages into a combined LTR message 313 and sends the LTR message 313 to the originating node 308. In this example, it is assumed that all links are operating properly.

Figure 4:
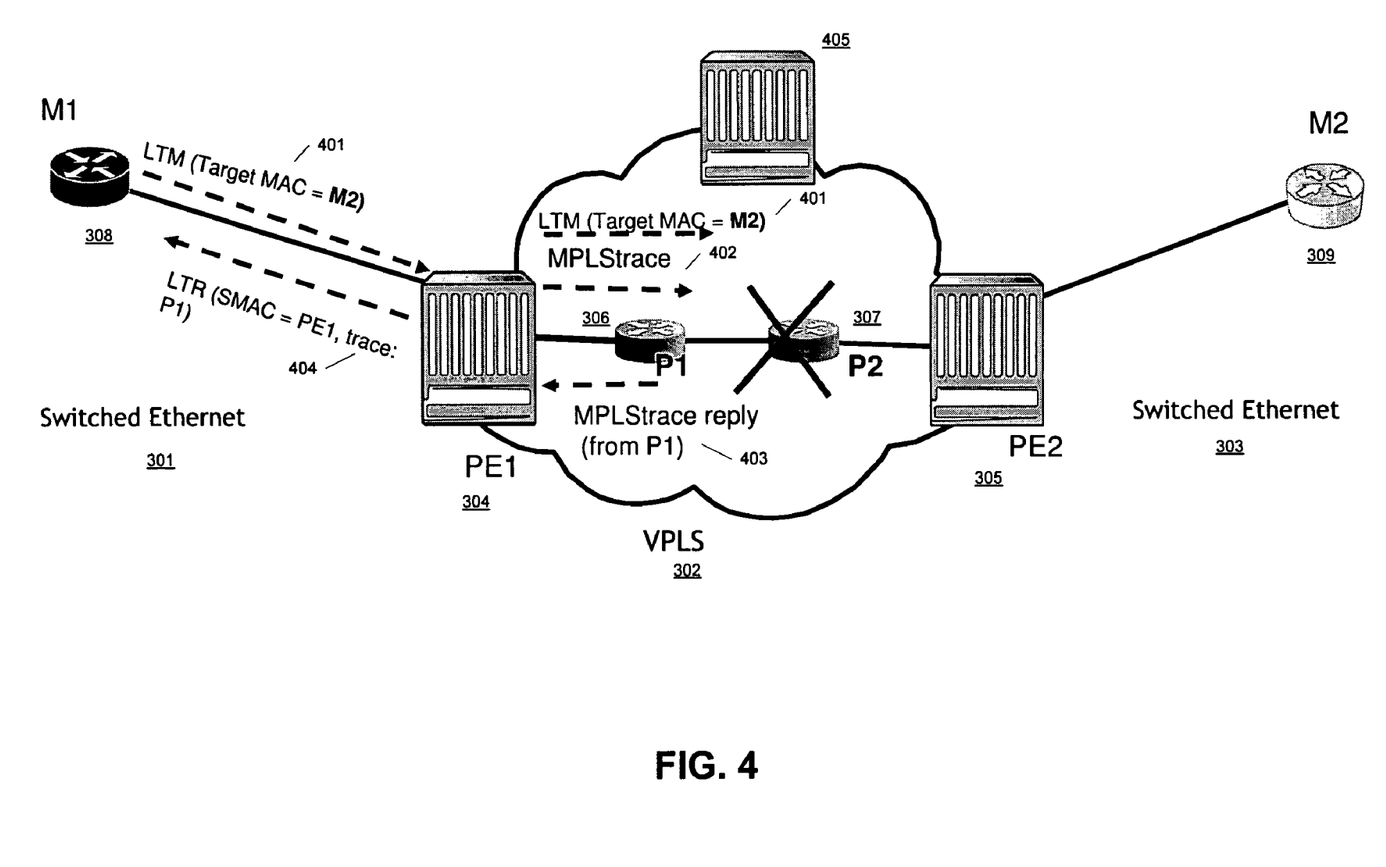
FIG. 4 is a block diagram diagrams illustrating certain fault scenarios in VPLS in a multi-tiered network configuration according to one embodiment of the invention.

FIG. 4 is a block diagram diagrams illustrating certain fault scenarios in a multi-tiered network configuration according to one embodiment of the invention. For purposes of illustration, certain references with respect to FIG. 3 are maintained the same. Referring to FIG. 4, in this example, it is assumed that core router 307 is malfunctioning. Similar to the configuration as shown in FIG. 3, when PE 304 receives an LTM message 401 from an originating Ethernet node 308, PE 304 forwards the LTM message 401 to a destination node, in this example, node 309 via a path having PE 304, core routers 306-307, and PE 305 of the MPLS network 302. Since core router 307 malfunctions herein, PE 305 and node 309 never receive LTM message 401. As a result, PE 304 never receives the corresponding LTR messages from PE 305 and node 309.

In addition, PE 304 initiates an MPLS trace session by sending an MPLS trace message 402 along the path to core routers 306-307 and PE 305 within the MPLS network 302. In this example, PE 304 would receive an MPLS trace reply message 403 from core router 306. However, since core router 307 malfunctions, PE 304 does not receive any MPLS trace reply messages from core router 307 and PE 305. In response to the MPLS trace reply message 403, PE 304 incorporates or translates the MPLS trace reply message 403 into an LTR message 403 that is compatible with Ethernet CFM, indicating that partial trace from core router 306 is received. As a result, when node 308 receives LTR message 404, node 308 can determines that there is an error in the path after core router 306.

Note that since other routers such as PE 405 that are not within the path (e.g., PE 304-core router 306-core router 307-PE 305) would not receive MPLS trace message 402 and no MPLS trace reply is expected from PE 405. Also note that unlike the configuration as shown in FIG. 1, where multiple LTR messages from each router along the path within the MPLS network are received by the originating node 308, there is only one LTR message herein representing all related nodes in the MPLS network.

Figure 5:
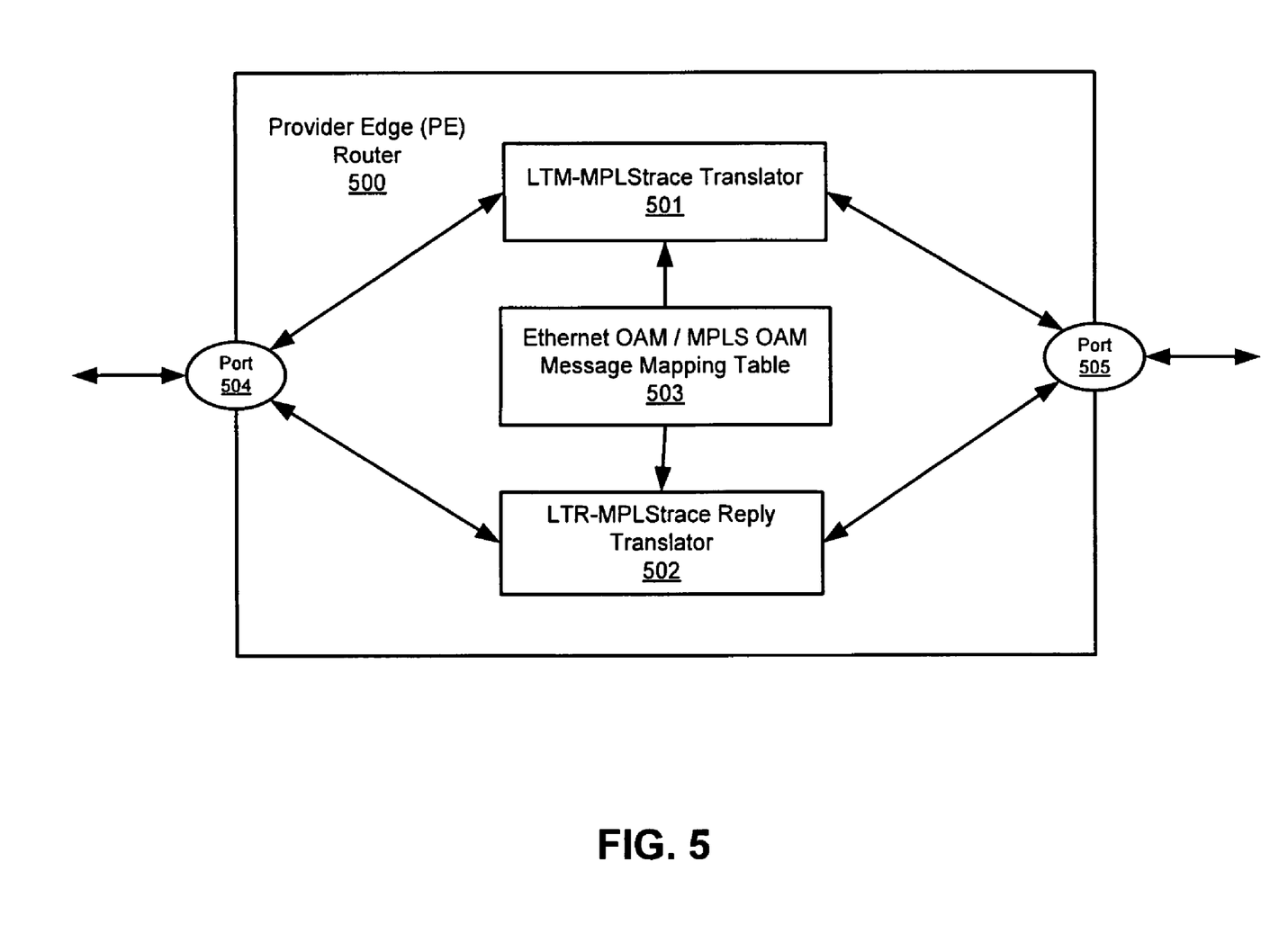
FIG. 5 is a block diagram illustrating a PE according to one embodiment of the invention.

FIG. 5 is a block diagram illustrating a PE according to one embodiment of the invention. For example, PE 500 may be implemented as part of PE 304 or PE 305 of FIG. 3. Referring to FIG. 5, in one embodiment, PE 500 includes, but is not limited to, LTM-MPLS trace translator 501 and LTR-MPLS trace reply translator 502. Translator 501 is configured to translate between Ethernet CFM's LTM messages and MPLS trace messages. Translator 502 is configured to translate between Ethernet CFM's LTR messages and MPLS trace reply messages. The translation operations performed by translators 501-502 may be performed based on Ethernet OAM and MPLS OAM message/event mapping table 503.

Typically, the CFM link trace message is used by a maintenance end point (MEP) of Ethernet to trace a path to another MEP or maintenance intermediate point (MIP) in the same domain. All MEPs or MIPs respond back to the originating MEP with a linktrace reply. Similarly, under MPLS OAM, LSP (label switched path) ping/traceroute messages are used for LSP failure detection and diagnosis based on MPLS echo requests and echo replies. An echo request packet is switched inband of LSP as it uses the same LSP label stack. An echo reply packet can take an MPLS or IP path to return to the source router. According to one embodiment, the mapping table 503 includes information for mapping CFM linktrace messages and the MPLS echo request/reply messages.

For example, it is assumed that port 504 is an ingress port of PE 500 and port 505 is an egress port of PE 500. When an LTM message is received by PE 500 via ingress port 404, in addition to forward the LTM message to its intended destination via egress port 505, LTM-MPLS trace translator 501 is invoke to translate the LTM message into an MPLS trace message based on information retrieved from message mapping table 503. The MPLS trace message is then transmitted via egress port 505 to other MPLS nodes along the corresponding path. When one or more MPLS trace reply messages are received via egress port 505, LTR-MPLS trace reply translator 502 is invoked to translate the MPLS trace replies into an LTR based on information retrieved from message mapping table 503. The LTR message is then transmitted via ingress port 504 back to the originating node. As a result, the originating node can determine which part of the MPLS network malfunctions based on the LTR translated from an MPLS trace reply message. Note that some or all of the components as shown in FIG. 5 may be implemented in software, hardware, or a combination of both software and hardware.

Figure 6:
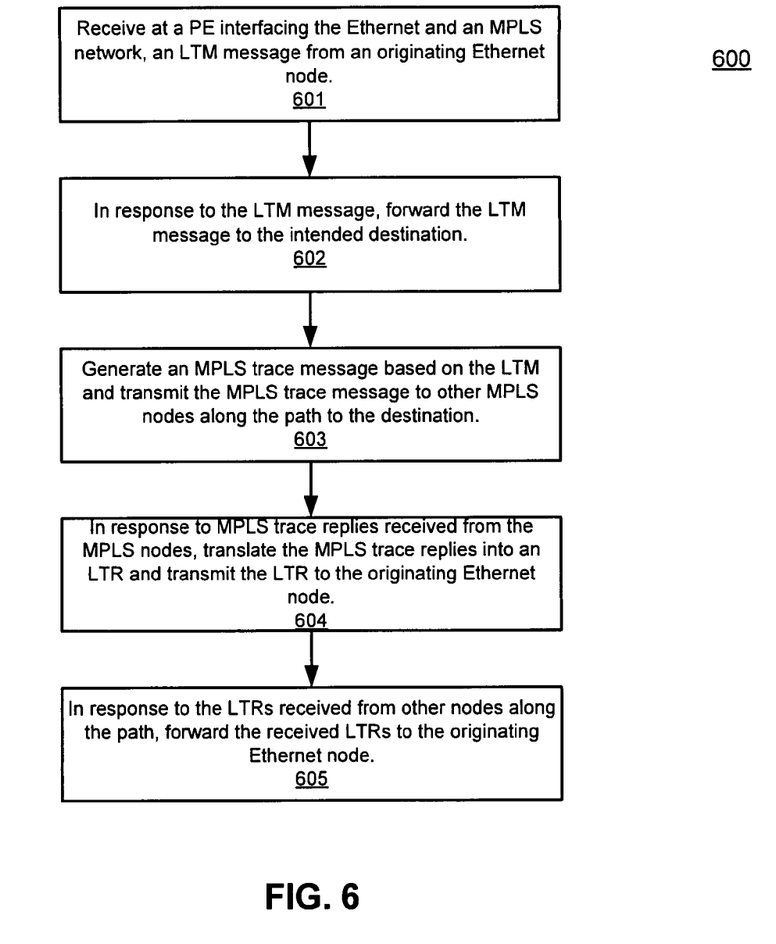
FIG. 6 is a flow diagram illustrating a process for detecting link failures in a multi-tiered network according to one embodiment of the invention.

FIG. 6 is a flow diagram illustrating a process for detecting link failures in a multi-tiered network according to one embodiment of the invention. Note that process 600 may be performed by processing logic which may include software, hardware, or a combination of both. For example, process 600 may be preformed by PE 500 of FIG. 5. Referring to FIG. 6, at block 601, an LTM message is received at a PE from an originating Ethernet node. In response to the LTM message is forwarded to the intended destination at block 602. In addition, at block 603, an MPLS trace message is generated based on the LTM message (e.g., translation) and then transmitted to other MPLS nodes within the MPLS network along the path to the destination of the LTM message. In response to the MPLS reply messages received from the MPLS nodes, at block 604, an LTR message is generated based on the MPLS reply messages and then transmitted back to the originating Ethernet node. At block 605, other ordinary LTR messages received from the other Ethernet nodes are forwarded back to the originating Ethernet node. Other operations may also be performed. Note that Ethernet in combination with an MPLS network is used as an example of multi-tiered network for the purposes of illustration. Other types of network combination may also be applied.

Thus, techniques for providing connectivity fault management (CFM) for a multi-tiered network have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for providing connectivity fault management (CFM) for a multi-tiered network, the method comprising:

receiving a link trace message (LTM) at a provider edge (PE) router, the PE router interfacing an Ethernet and a multi-protocol label switching (MPLS) network, wherein the LTM message is originated from a first Ethernet node and destined to a second Ethernet node; and in response to the LTM message, performing the following steps comprising:

forwarding from the PE router the LTM message to the second Ethernet node along a path between the first and second Ethernet nodes within the MPLS network, initiating at the PE router an MPLS trace session, including generating an MPLS trace message based on the LTM message and sending the MPLS trace message to one or more MPLS nodes along the path, wherein generating an MPLS trace message comprises translating the LTM message to the MPLS trace message based on Ethernet CFM and MPLS OAM mapping information maintained within the PE router, receiving one or more MPLS trace reply messages from the one or more MPLS nodes of the MPLS network, wherein the one or more MPLS trace reply messages are received in response to the MPLS trace message generated based on the LTM message, generating a first link trace reply (LTR) message based on the one or more MPLS trace reply messages, wherein the LTM message and the first LTR message are compatible with an Ethernet CFM standard, wherein the MPLS trace message and MPLS reply message are compatible with an MPLS operations administration and management (OAM) standard, sending the first LTR message to the first Ethernet node over the Ethernet, receiving a second LTR message from one or more nodes along the path, wherein the second LTR message is received in response to the LTM message, and forwarding the second LTR message from the PE router to the first Ethernet node.

2. A non-transitory machine-readable storage medium having instructions stored therein, which when executed by a process, cause the process to perform a method for providing connectivity fault management (CFM) for a multi-tiered network, the method comprising:

receiving a link trace message (LTM) at a provider edge (PE) router, the PE router interfacing an Ethernet and a multi-protocol label switching (MPLS) network, wherein the LTM message is originated from a first Ethernet node and destined to a second Ethernet node; and in response to the LTM message, performing the following steps comprising:

forwarding from the PE router the LTM message to the second Ethernet node along a path between the first and second Ethernet nodes within the MPLS network, initiating at the PE router an MPLS trace session, including generating an MPLS trace message based on the LTM message and sending the MPLS trace message to one or more MPLS nodes along the path, wherein generating an MPLS trace message comprises translating the LTM message to the MPLS trace message based on Ethernet CFM and MPLS OAM mapping information maintained within the PE router, receiving one or more MPLS trace reply messages from the one or more MPLS nodes of the MPLS network, wherein the one or more MPLS trace reply messages are received in response to the MPLS trace message generated based on the LTM message, generating a first link trace reply (LTR) message based on the one or more MPLS trace reply messages, wherein the LTM message and the first LTR message are compatible with an Ethernet CFM standard, wherein the MPLS trace message and MPLS reply message are compatible with an MPLS operations administration and management (OAM) standard, sending the first LTR message to the first Ethernet node over the Ethernet, receiving a second LTR message from one or more nodes along the path, wherein the second LTR message is received in response to the LTM message, and forwarding the second LTR message from the PE router to the first Ethernet node.

3. The method of claim 1, wherein initiating the MPLS trace session and forwarding the LTM message to the second Ethernet node are performed by the PE router substantially concurrently.

4. The method of claim 1, wherein generating a first LTR message comprises translating the MPLS trace reply messages to the first LTR message based on the Ethernet CFM and MPLS OAM mapping information maintained within the PE router.

5. The method of claim 4, wherein the first LTR message is a single LTR message representing connectivity information for multiple MPLS nodes within the MPLS network.

6. The medium of claim 2, wherein initiating the MPLS trace session and forwarding the LTM message to the second Ethernet node are performed by the PE router substantially concurrently.

7. The medium of claim 6, wherein generating a first LTR message comprises translating the MPLS trace reply messages to the first LTR message based on the Ethernet CFM and MPLS OAM mapping information maintained within the PE router.

8. The medium of claim 7, wherein the first LTR message is a single LTR message representing connectivity information for multiple MPLS nodes within the MPLS network.

9. A provider edge (PE) router of a multi-tiered network for interfacing an Ethernet and a multi-protocol label switching (MPLS) network, the PE router comprising:

an ingress interface to receive a link trace message (LTM) originated from a first Ethernet node and destined to a second Ethernet node;

a forwarding engine to forward the LTM message to the second Ethernet node along a path between the first and second Ethernet nodes within the MPLS network;

an LTM-MPLS trace translator, in response to the LTM message, to initiate an MPLS trace session, including generating an MPLS trace message based on the LTM message and sending the MPLS trace message to one or more MPLS nodes along the path;

a link trace reply (LTR)-MPLS trace reply translator, in response to one or more MPLS trace reply messages received from the one or more MPLS nodes of the MPLS network, to generate a first LTR message based on the one or more MPLS trace reply messages and to send the first LTR message to the first Ethernet node over the Ethernet, wherein the LTM message and the first LTR message are compatible with an Ethernet CFM standard, wherein the MPLS trace message and MPLS reply message are compatible with an MPLS operations administration and management (OAM) standard; and an Ethernet CFM and MPLS OAM mapping information base, wherein the LTM-MPLS trace translator is configured to translate the LTM message to the MPLS trace message based on Ethernet CFM and MPLS OAM mapping information maintained within the PE router, wherein in response to a second LTR message received from one or more nodes along the path, the forwarding engine is configured to forward the second LTR message to the first Ethernet node.

10. The PE router of claim 9, wherein initiating the MPLS trace session and forwarding the LTM message to the second Ethernet node are performed by the PE router substantially concurrently.

11. The PE router of claim 9, wherein the LTR-MPLS trace reply translator is configured to translate the MPLS trace reply messages to the first LTR message based on the Ethernet CFM and MPLS OAM mapping information maintained within the PE router.

12. The PE router of claim 11, wherein the first LTR message is a single LTR message representing connectivity information for multiple MPLS nodes within the MPLS network.

* * * * *

UNITED STATES PATENT AND TRADEMARK OFFICE
CERTIFICATE OF CORRECTION

| | | |
|---|---|---|
| PATENT NO. | : 7,966,420 B2 | |
| APPLICATION NO. | : 11/955971 | |
| DATED | : June 21, 2011 | |
| INVENTOR(S) | : Mehta et al. | |

It is certified that error appears in the above-identified patent and that said Letters Patent is hereby corrected as shown below:

In Column 8, Line 5, in Claim 7, delete "claim 6," and insert -- claim 2, --, therefor.

Signed and Sealed this
Seventh Day of February, 2012

David J. Kappos
*Director of the United States Patent and Trademark Office*